(12) United States Patent
Moon et al.

(10) Patent No.: US 9,615,467 B2
(45) Date of Patent: Apr. 4, 2017

(54) MOUNTING STRUCTURE FOR CIRCUIT BOARDS IN ELECTRONIC DEVICE

(71) Applicant: Samsung Electronics Co., Ltd, Gyeonggi-do (KR)

(72) Inventors: Hee-Cheul Moon, Gyeonggi-do (KR); Jae-Il Seo, Gyeonggi-do (KR); Hong-Moon Chun, Gyeonggi-do (KR)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 228 days.

(21) Appl. No.: 13/875,063

(22) Filed: May 1, 2013

(65) Prior Publication Data

US 2013/0294047 A1    Nov. 7, 2013

(30) Foreign Application Priority Data

May 2, 2012    (KR) .................. 10-2012-0046403

(51) Int. Cl.
| | | |
|---|---|---|
| *H04M 1/00* | (2006.01) | |
| *H05K 5/00* | (2006.01) | |
| *H04M 1/02* | (2006.01) | |
| *F21V 33/00* | (2006.01) | |
| *H04M 1/22* | (2006.01) | |
| *H04M 1/23* | (2006.01) | |

(52) U.S. Cl.
CPC ....... *H05K 5/0017* (2013.01); *F21V 33/0052* (2013.01); *H04M 1/0277* (2013.01); *H04M 1/22* (2013.01); *H04M 1/23* (2013.01); *H04M 2250/22* (2013.01)

(58) Field of Classification Search
CPC ..... H04M 1/02; G06F 3/0416; G02F 1/13338

USPC .................................. 455/566; 345/173–174
See application file for complete search history.

(56) References Cited

U.S. PATENT DOCUMENTS

| | | | |
|---|---|---|---|
| 4,158,115 A * | 6/1979 | Parkinson et al. ............ 200/5 A |
| 2003/0006701 A1* | 1/2003 | Hanahara ............. H01H 13/702 313/512 |
| 2003/0202336 A1* | 10/2003 | Ostergard ............... H04M 1/22 362/23.06 |

(Continued)

FOREIGN PATENT DOCUMENTS

| | | |
|---|---|---|
| CN | 201781518 | 3/2011 |
| CN | 102314256 | 1/2012 |

(Continued)

OTHER PUBLICATIONS

Patent Examination Report No. 1 dated Mar. 18, 2015 in connection with Australian Patent Application No. 2013255116; 3 pages.

(Continued)

*Primary Examiner* — Sean Gramling
*Assistant Examiner* — Gerald J Sufleta, II

(57) ABSTRACT

A mounting structure for circuit boards in an electronic device is provided. The mounting structure includes a housing, a first circuit board, a second circuit board, and an electrical connector. The housing houses parts. The first circuit board is fixed to the housing. The second circuit board is overlapped in at least a portion with the first circuit board and is fixed to the housing. The electrical connector is configured to electronically connect the first circuit board and the second circuit board.

18 Claims, 10 Drawing Sheets

(56) References Cited

U.S. PATENT DOCUMENTS

| | | |
|---|---|---|
| 2004/0240190 A1 | 12/2004 | Hsu et al. |
| 2007/0236462 A1 | 10/2007 | Morris et al. |
| 2008/0030475 A1 | 2/2008 | Shin |
| 2008/0174565 A1 | 7/2008 | Chang et al. |
| 2009/0179862 A1 | 7/2009 | Strong, IV |
| 2010/0075720 A1* | 3/2010 | Lee et al. ................. 455/566 |

FOREIGN PATENT DOCUMENTS

| | | |
|---|---|---|
| EP | 2 169 923 A2 | 3/2010 |
| KR | 1020110002366 A | 1/2011 |
| KR | 1020120021070 A | 3/2012 |

OTHER PUBLICATIONS

Translated Japanese Office Action dated Jul. 6, 2015 in connection with Japanese Patent Application No. 2015-508876; 7 pages.
Written Opinion of the International Searching Authority dated Aug. 26, 2013 in connection with International Patent Application No. PCT/KR2013/003781.
International Search Report dated Aug. 26, 2013 in connection with International Patent Application No. PCT/KR2013/003781.
European Search Report dated Aug. 26, 2013 in connection with European Patent Application No. EP 13 16 5422.
Chinese Office Action and English translation issued for CN 201380022884.4 dated Jan. 27, 2016, 19 pgs.
Australian Office Action issued for AU 2013255116 dated Nov. 30, 2015, 2 pgs.
Second Office Action dated Sep. 26, 2016 in connection with Chinese Application No. 201380022884.4, 19 pages.

* cited by examiner

ND CLAIM OF PRIORITY

MOUNTING STRUCTURE FOR CIRCUIT BOARDS IN ELECTRONIC DEVICE

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on May 2, 2012 and assigned Serial No. 10-2012-0046403, the contents of which are herein incorporated by reference.

TECHNICAL FIELD

The present disclosure relates to a structure of mounting circuit boards in an electronic device.

BACKGROUND

At present, owing to the development of the electronic communication industry, electronic devices such as mobile communication terminals (i.e., cellular phones), electronic schedulers, personal complex terminals and the like are becoming necessities to modern society while becoming significant means of delivery of rapidly changing information.

In recent years, as a tendency of preferring a large screen becomes distinct, an electronic device cannot help being large-sized because it constructs a larger screen. In this situation, ironically, several ways of, even while constructing a large screen, minimizing an electronic device and making appearance beautiful or enhancing portability are being sought. Typically, there is a way of reducing a width of a housing in an electronic device. Commonly, the electronic device constructs buttons for generating input signals of corresponding functions according to user's pressing, in the housing. A small housing makes it difficult to construct the buttons in a narrowed space. Further, among these buttons, there may be a button constructed as a separate circuit board as well. This makes more difficult mounting in a restricted space. This problem is not limited to the circuit board of the button, and is becoming, a problem to solve in an electronic device constructing, a plurality of boards.

FIG. 1 illustrates a conventional mounting structure for circuit boards in an electronic device.

Referring to FIG. 1, the mounting structure 1000 for circuit boards includes a housing 1110, and a main board 1120 and a touch key (button) board 1130 which are housed in the housing 1110.

The housing 1110 forms an appearance of the electronic device, and the main board 1120 and the touch keyboard 1130 are fixed to an inner surface of the housing 1110. The housing 1110 constructs a transparent window 1112. Through the window 1112, a display panel 1122 of the main board 1120 is seen to the external. Further, the housing 1110 constructs an indicator part 1113 indicating touch buttons, and the touch keyboard 1110 is disposed under the indicator part 1113. The touch keyboard 1130 constructs an electrode surface 1132. The electrode surface 1132 is indirect touched by a user's finger through the medium of the indicator part 1113 of the housing 1110. The main board 1120 senses this indirect touch and performs a corresponding function.

Particularly, the conventional mounting structure 1000 for circuit boards arranges the main board 1120 and the touch keyboard 1130 side by side horizontally instead of laminating them. Therefore, as illustrated, the touch keyboard 1130 is disposed biased excessively toward a bottom end of the electronic device. This has a problem of deteriorating usability and restricting the freedom of other structures.

SUMMARY

To address the above-discussed deficiencies of the prior art, it is a primary object to provide a mounting structure for circuit boards capable of reducing or minimizing a size of an electronic device.

Another aspect of the present disclosure is to provide a mounting structure for circuit boards for reducing the waste of a mounting space when realizing a touch button.

The above aspects are achieved by providing a mounting structure for circuit boards in an electronic device.

According to one aspect of the present disclosure, a mounting structure for circuit boards in an electronic device is provided. The mounting structure includes a housing, a first circuit board, a second circuit board, and a connection means. The housing houses parts. The first circuit board is fixed to the housing. The second circuit board is overlapped in at least a portion with the first circuit board and is fixed to the housing. The connection means electronically connects the first circuit board and the second circuit board.

According to another aspect of the present disclosure, an electronic device is provided. The electronic device includes a housing, a main board, a sub board, and a connection means. The housing constructs a window and a button indicator part. The main board is attached to the window of the housing and mounts a display panel displaying an image. The sub board is attached to the button indicator part of the housing and constructs a module receiving a touch. The connection means electrically connects the main board and the sub board. At least a portion of the sub board is disposed in a space that the display panel does not occupy between the housing and the main board.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 2A through 4C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Preferred embodiments of the present disclosure will be described herein below with reference to the accompanying drawings. In the following description, well-known functions or constructions are not described in detail since they would obscure the disclosure in unnecessary detail. And, terms described below, which are defined considering functions in the present disclosure, can be different depending on user and operator's intention or practice. Therefore, the terms should be defined on the basis of the disclosure throughout this specification.

The present disclosure provides a mounting structure for circuit boards capable of reducing the waste of a mounting space and reducing or minimizing a size of an electronic device. An exemplary embodiment of the present disclosure provides a mounting structure for circuit boards in an electronic device, which includes a housing, a first circuit board fixed to the housing, a second circuit board overlapped in at least a portion with the first circuit board and fixed to the housing, and a connection means for electrically connecting the first circuit board and the second circuit board. Further, an exemplary embodiment of the present disclosure provides an electronic device, which includes a housing constructing a transparent window and a transparent button indicator part, a main board attached to the window of the housing and mounting a display panel displaying an image, a sub board attached to the button indicator part of the housing and constructing a module receiving a touch, and a connection means for electrically connecting the main board and the sub board. At least a portion of the sub board is disposed in a space that the display panel of the main board does not occupy between the housing and the main board.

Figure 1:
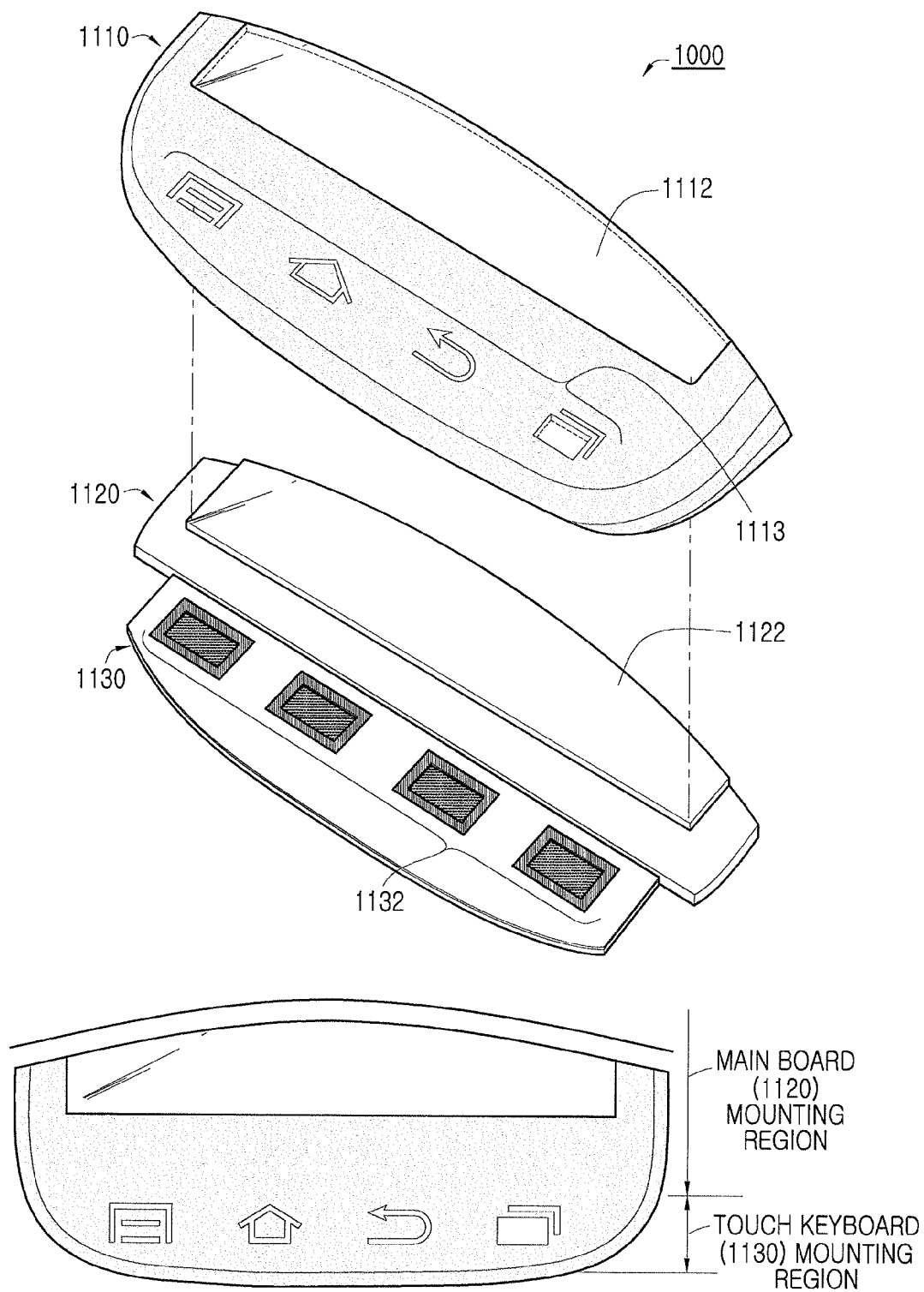
FIG. 1 illustrates a conventional mounting structure for circuit boards in an electronic device.
Figure 2A:
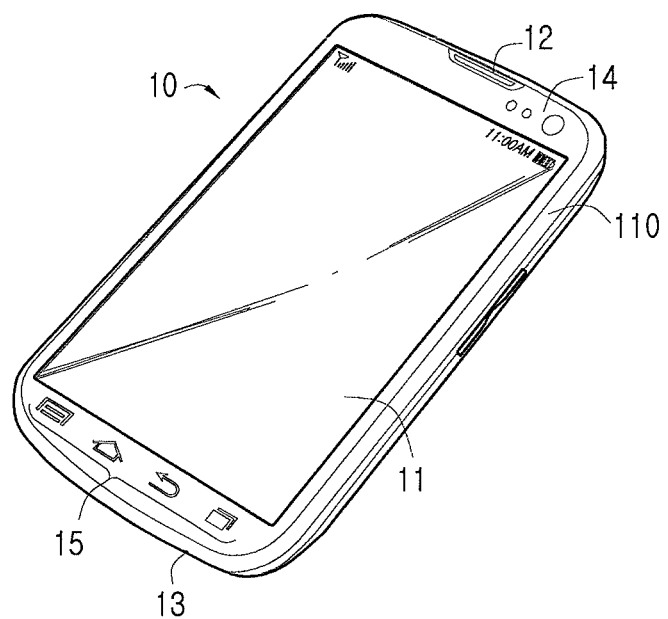
FIG. 2A illustrates a perspective view of an electronic device according to an exemplary embodiment of the present disclosure.

FIG. 2A illustrates an electronic device according to an exemplary embodiment of the present disclosure.

Referring to FIG. 2A, the electronic device 10 provides a screen 11, a speaker 12, a microphone 13, a sensor 14, and touch buttons 15, and they are housed in a housing 110. Particularly, a mounting structure for circuit boards providing the screen 11 and the touch buttons 15 can reduce or minimize the size of the electronic device 10 because not wasting a space. A construction of the mounting structure is described below in detail with reference to the drawings.

Figure 2B:
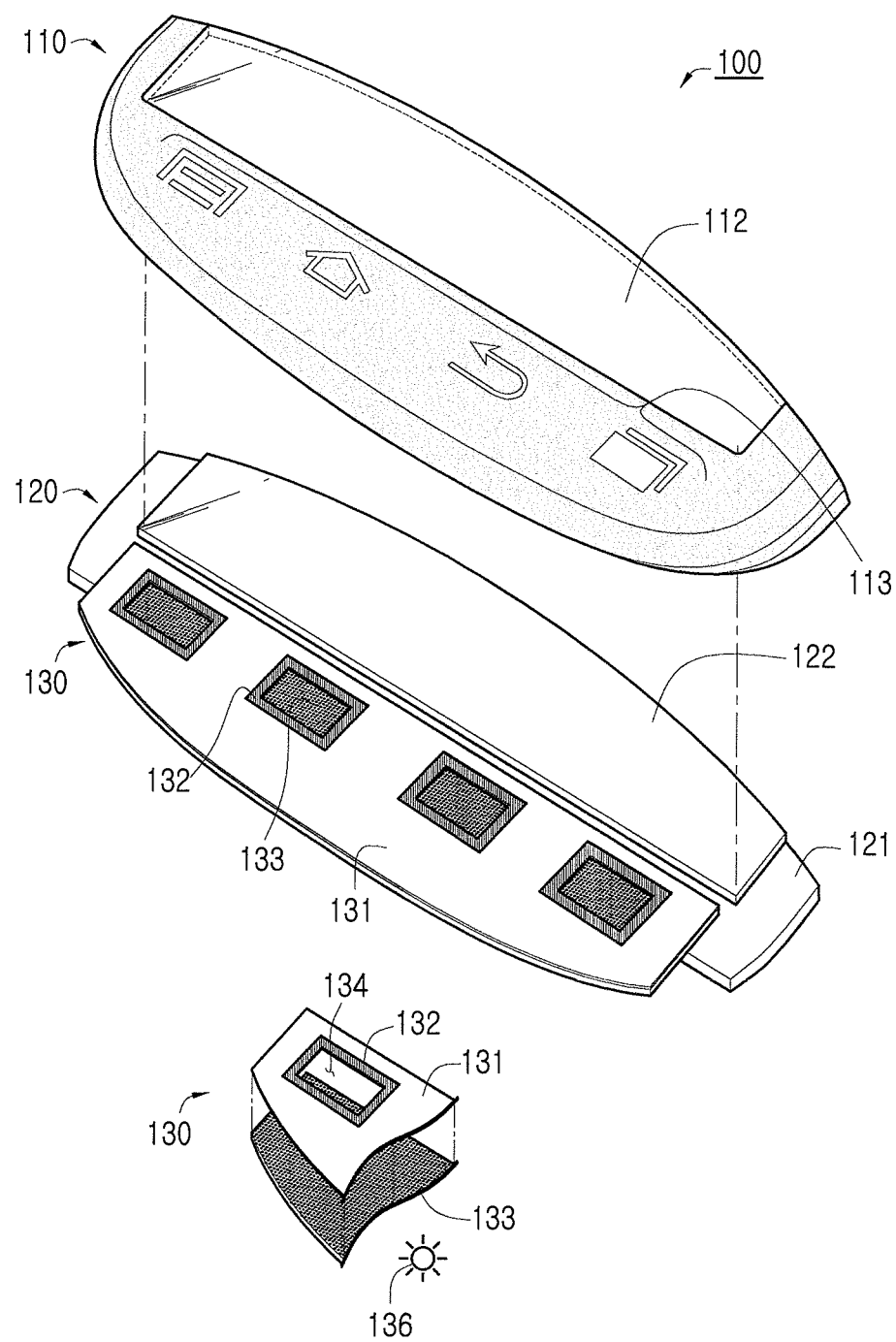
FIG. 2B illustrates a mounting structure for circuit boards in an electronic device according to an exemplary embodiment of the present disclosure.

FIG. 2B illustrates a mounting structure for circuit boards in an electronic device according to an exemplary embodiment of the present disclosure.

Referring to FIG. 2B, the mounting structure 100 for circuit boards includes a housing 110, and a main board 120 and a sub board 130 which are housed in the housing 110.

The housing 110 forms an appearance of the electronic device 10, and the main board 120 and the sub board 130 are fixed to an inner surface of the housing 110. The housing 110 constructs a transparent window 112. Through the window 112, a display panel 122 of the main board 120 is seen to the external. Further, the housing 110 constructs a button indicator part 113 indicating the touch buttons 15. The indicator part 113 is transparent and thus, transmits light forwarded from the sub board 130.

The main board 120 is the part of setting up an execution environment of the electronic device 10, keeping the information of the electronic device 10, permitting stable driving of the electronic device 10, and making smooth data input/output exchange of all units of the electronic device 10. The main board 120 mounts a Printed Circuit Board (PCB) 121 containing basic circuit and parts, and a plurality of parts, for example, a microprocessor, a sub processor, a memory, a Basic Input Output System (BIOS), a connection circuit and the like. Particularly, the main board 120 mounts a display panel 122 outputting an image and a touch sensor (not shown) sensing a user touch. This display panel 122 can be a touch screen.

The sub board (or touch keyboard) 130 receives a user touch and is electrically connected with the main board 120. The sub board 130 and the main board 120 can be electrically connected using an electrical connector 137 such as a Flexible PCB (FPCB), a cable, a wire and the like. The sub board 130 contains basic circuit and parts, and includes a PCB (or FPCB) 131 and a Light Guide Film (LGF) 133 attached to a lower surface of the PCB 131. The sub board 130 is attached to an inner surface of the housing 110. The PCB 131 constructs an opening 134 not covering the indicator part 113 of the housing 110. The light guide film 133 can forward light forwarded from a light source 136, and is exposed through the opening 134. The light from the light guide film 133 exposed through the opening 134 of the PCB 131 is emitted through the indicator part 113 of the housing 110. The indicator part 113 of the housing 110 emits light and thus, a user recognizes the existence of the touch buttons 15. Further, the indicator part 113 emitting the light makes the touch buttons 15 beautiful. The light source 136 can be a Light Emitting Diode (LED), and can be mounted on the PCB 131 of the sub board 130.

Further, the sub board 130 constructs an electrode surface 132 around the opening 134. The electrode surface 132 is indirect touched through the medium of the indicator part 113 of the housing 110. This indirect touch is sensed through the touch sensor of the main board 120. A user touches the indicator part 113 of the housing 110 and, if so, the touch sensor of the main board 120 senses a variation of capacitance of the electrode surface 132 resulting from the user touch. The touch sensor of the main board 120 can identify which one of the several touch buttons 15 is touched. The sub board 130 constructs a circuit for this, and the main board 120 performs a corresponding function according to a signal of the touch sensor of the main board 120.

In order for the mounting structure for circuit boards according to the exemplary embodiment of the present disclosure to reduce the waste of space, at least a portion of the sub board 130 is placed on the main board 120. This is described below in detail with reference to FIG. 2C.

Figure 2C:
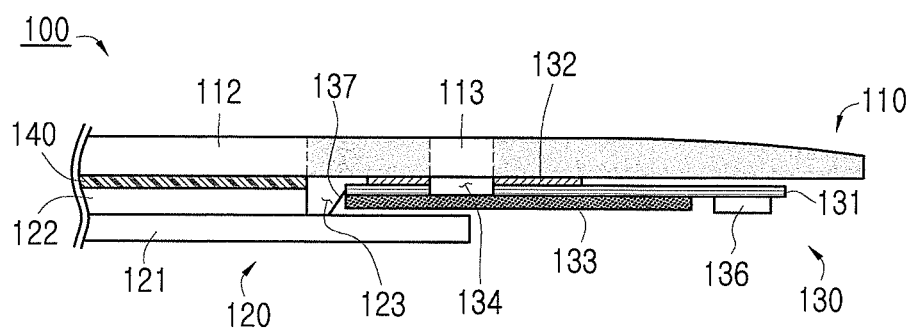
FIG. 2C illustrates a cross section of a mounting structure for circuit boards in an electronic device according to an exemplary embodiment of the present disclosure.

FIG. 2C illustrates a cross section of a mounting structure for circuit boards in an electronic device according to an exemplary embodiment of the present disclosure.

Referring to FIG. 2C, the main board 120 and the sub board 130 are fixed to the housing 110. The display panel 122 of the main board 120 and the window 112 of the housing 110 can be attached to each other using an adhesive 140. This adhesive 140 can be a Super View Resin (SVR), an Optically Clear Adhesive (OCA) and the like. Also, the display panel 122 of the main board 120 and the window 112 of the housing 110 can be fixed to each other with interposing an air gap of a predetermined thickness therebetween. Further, the sub board 130 and the housing 110 may be also fixed to each other with interposing an air gap of a predetermined thickness therebetween. When the main board 120 is attached to the housing 110, there is a space, specifically, a space that the display panel 122 does not occupy between the main board 120 and the housing 110. This space 123 houses the at least portion of the sub board 130. The sub board 130 is interposed between the housing 110 and the main board 120, but is not necessarily in contact with the main board 120.

Figure 2D:
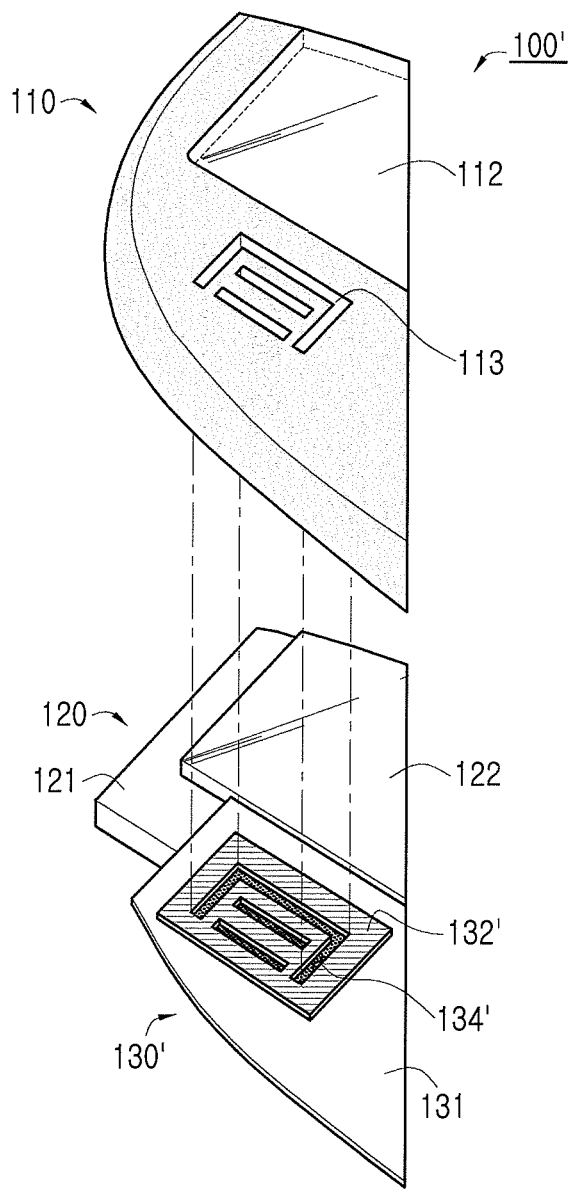
FIG. 2D illustrates a shape of an electrode surface of a sub board in an electronic device according to an exemplary embodiment of the present disclosure.

FIG. 2D illustrates a shape of an electrode surface of a sub board in an electronic device according to an exemplary embodiment of the present disclosure.

Referring to FIG. 2D, an opening 134' of a sub board 130' has a shape following the indicator part 113 of the housing 110. An electrode surface 132' of the sub board 130' has a shape including a region besides the opening 134'. The electrode surface 132' is more extended than the electrode surface 132 illustrated in FIG. 2B and thus, enhances touch recognition.

Figure 3A:
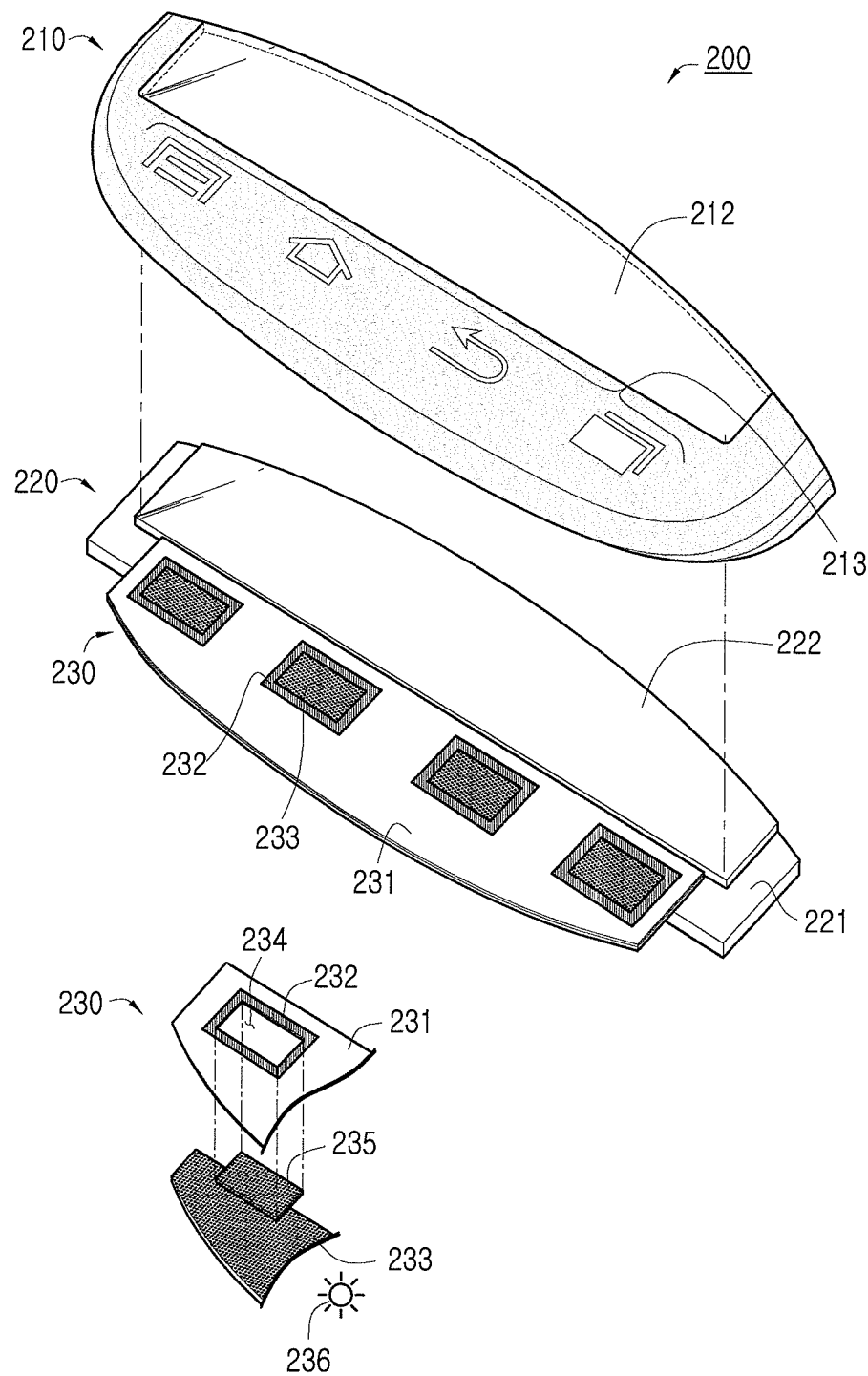
FIG. 3A illustrates a mounting structure for circuit boards in an electronic device according to an exemplary embodiment of the present disclosure.

FIG. 3A illustrates a mounting structure for circuit boards in an electronic device according to an exemplary embodiment of the present disclosure.

Referring to FIG. 3A, the mounting structure 200 for circuit boards includes a housing 210, and a main board 220 and a sub board 230 which are housed in the housing 210.

The housing 210 forms an appearance of the electronic device 10, and the main board 220 and the sub board 230 are fixed to an inner surface of the housing 210. The housing 210 constructs a transparent window 212. Through the window 212, a display panel 222 of the main board 220 is seen to the external. Further, the housing 210 constructs an indicator part 213 indicating touch buttons 15. The indicator part 213 is transparent and thus, transmits light forwarded from the sub board 230.

The main board 220 is the part of setting up an execution environment of the electronic device 10, keeping the information of the electronic device 10, permitting stable driving of the electronic device 10, and making smooth data input/output exchange of all units of the electronic device 10. The main board 220 mounts a PCB 221 containing basic circuit and parts, and a plurality of parts, for example, a microprocessor, a sub processor, a memory, a BIOS, a connection circuit and the like. Particularly, the main board 220 mounts a display panel 222 outputting an image and a touch sensor (not shown) sensing a user touch.

The sub board 230 receives a user touch and is electrically connected with the main board 220. The sub board 230 and the main board 220 can be electrically connected using a connection means (not shown) such as an FPCB, a cable, a wire and the like. The sub board 230 contains basic circuit and parts, and includes a PCB (or FPCB) 231 and a light guide film 233 attached to a lower surface of the PCB 231. The sub board 230 is attached to an inner surface of the housing 210. The PCB 231 constructs an opening 234 not covering the indicator part 213 of the housing 210. The light guide film 233 can forward light forwarded from a light source 136, and is exposed through the opening 234. The light from the light guide film 233 exposed through the opening 234 of the PCB 231 is emitted through the indicator part 213 of the housing 210. The indicator part 213 emits light and thus, a user recognizes the existence of the touch buttons 15. Further, the indicator part 213 emitting the light makes the touch buttons 15 beautiful. The light source 136 can be an LED, and can be mounted on the PCB 231 of the sub board 230.

Particularly, the light guide film 233 is extended to fill the opening 234, and is not interposed between the housing 210 and the main board 220. This is described in detail with reference to FIG. 3B.

Further, the sub board 230 constructs an electrode surface 232 around the opening 234. The electrode surface 232 is indirect touched through the medium of the indicator part 213 of the housing 210. This indirect touch is sensed through the touch sensor of the main board 220. A user touches the indicator part 213 of the housing 210 and, if so, the touch sensor of the main board 220 senses a variation of capacitance of the electrode surface 232 resulting from the user touch. The touch sensor of the main board 220 can identify which one of the several touch buttons 15 is touched. The sub board 230 constructs a circuit for this, and the main board 220 performs a corresponding function according to a signal of the touch sensor of the main board 220.

In order for the mounting structure for circuit boards according to the exemplary embodiment of the present disclosure to reduce the waste of space, at least a portion of the sub board 230 is placed on the main board 220. This is described below in detail with reference to FIG. 3B.

Figure 3B:
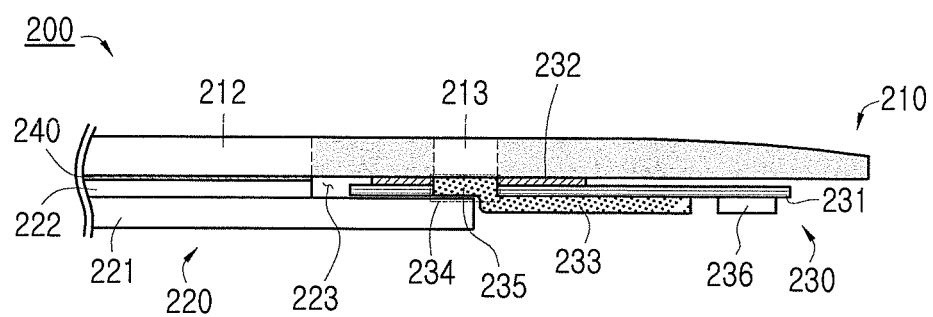
FIG. 3B illustrates a cross section of a mounting structure for circuit boards in an electronic device according to an exemplary embodiment of the present disclosure.

FIG. 3B illustrates a mounting structure for circuit boards in an electronic device according to an exemplary embodiment of the present disclosure.

Referring to FIG. 3B, the main board 220 and the sub board 230 are fixed to the housing 210. The display panel 222 of the main board 220 and the window 212 of the housing 210 can be attached to each other using an adhesive 240. This adhesive 240 can be an SVR, an OCA and the like. When the main board 220 is attached to the housing 210, there is a space, specifically, a space that the display panel 222 does not occupy between the main board 220 and the housing 210. This space 223 houses the at least portion of the sub board 230.

Further, as aforementioned, the light guide film 233 fills the opening 234 as denoted by reference numeral 235 and has a shape extended from the light source 236 such that the light guide film 233 is not interposed between the housing 210 and the main board 220. This is to consider a size (volume) of the void space 223 between the housing 210 and the main board 220. The sub board 230 can reduce a thickness of the portion housed in the void space 223 between the housing 210 and the main board 220. This construction plays a role of reducing a failure of a process of attaching the display panel 221 of the main board 220 to the window 212 of the housing 210. The reason is given as follows. In a case where the sub board 230 is disposed between the housing 210 and the main board 220, as the sub board 230 gets thick, the adhesive 240 used for attaching the display panel 221 of the main board 220 to the window 212 of the housing 210 gets thick as well. When the adhesive 240 is thick, the adhesive 240 takes a longer time to harden the adhesive 240. When the adhesive 240 is excessive in amount, the adhesive 240 is not well hardened and flows down, resulting in a failure. In result, the construction of the present disclosure can reduce the thickness of the adhesive 240, preventing a failure.

Figure 4A:
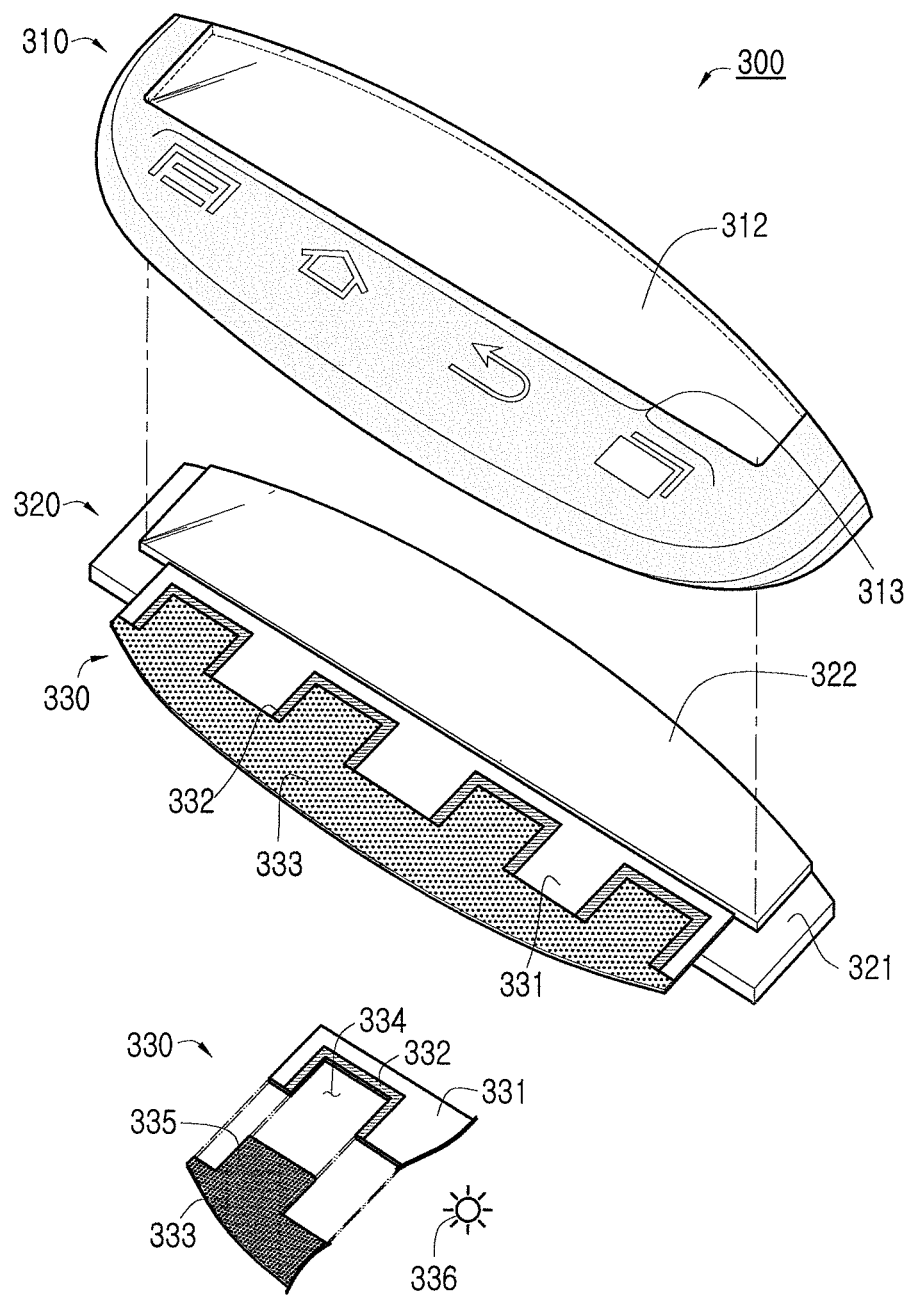
FIG. 4A illustrates a mounting structure for circuit boards in an electronic device according to an exemplary embodiment of the present disclosure.

FIG. 4A illustrates a mounting structure for circuit boards in an electronic device according to an exemplary embodiment of the present disclosure.

Referring to FIG. 4A, the mounting structure 300 for circuit boards includes a housing 310, and a main board 320 and a sub board 330 which are housed in the housing 310.

The housing 310 forms an appearance of the electronic device 10, and the main board 320 and the sub board 330 are fixed to an inner surface of the housing 310. The housing 310 constructs a transparent window 312. Through the window 312, a display panel 322 of the main board 320 is seen to the external. Further, the housing 310 constructs an indicator part 313 indicating touch buttons 15. The indicator part 313 is transparent and thus, transmits light forwarded from the sub board 330.

The main board 320 is the part of setting up an execution environment of the electronic device 10, keeping the information of the electronic device 10, permitting stable driving of the electronic device 10, and making smooth data input/output exchange of all units of the electronic device 10. The main board 320 mounts a PCB 321 containing basic circuit and parts, and a plurality of parts, for example, a microprocessor, a sub processor, a memory, a BIOS, a connection circuit and the like. Particularly, the main board 320 mounts a display panel 322 outputting an image and a touch sensor (not shown) sensing a user touch.

The sub board 330 receives a user touch and is electrically connected with the main board 320. The sub board 330 and the main board 320 can be electrically connected using a connection means (not shown) such as an FPCB, a cable, a wire and the like. The sub board 330 contains basic circuit and parts, and includes a PCB (or FPCB) 331 and a light guide film 333 coupled with the PCB 331. The sub board 330 is attached to an inner surface of the housing 310. The PCB 331 constructs an opening 334, which does not cover the indicator part 313 of the housing 310 and is opened at one side. The light guide film 333 can forward light forwarded from a light source 136, and the light guide film 333 has a portion 335 capable of being fitted into the opening 334 and is placed side by side horizontally with the PCB 331. That is, the light guide film 333 is not laminated on the PCB 331. This is described in detail with reference to FIG. 4B. The light guide film 333 forwards light from the light source 336, to the portion 335 fitted into the opening 334 and thus, the indicator part 313 of the housing 310 gets bright. The light source 336 can be an LED, and can be mounted on the PCB 321 of the main board 320 or the PCB 331 of the sub board 330.

Further, the sub board 330 constructs an electrode surface 332 around the opening 334. The electrode surface 332 is indirect touched through the medium of the indicator part 313 of the housing 310. This indirect touch is sensed through the touch sensor of the main board 320. A user touches the indicator part 313 of the housing 310 and, if so, the touch sensor of the main board 320 senses a variation of capacitance of the electrode surface 332 resulting from the user touch. The touch sensor of the main board 320 can identify which one of the several touch buttons 15 is touched. The sub board 330 constructs a circuit for this, and the main board 320 performs a corresponding function according to a signal of the touch sensor of the main board 320.

In order for the mounting structure 300 for circuit boards according to the exemplary embodiment of the present disclosure to reduce the waste of space, at least a portion of the sub board 330 is placed on the main board 320. This is described below in detail with reference to FIG. 4B.

Figure 4B:
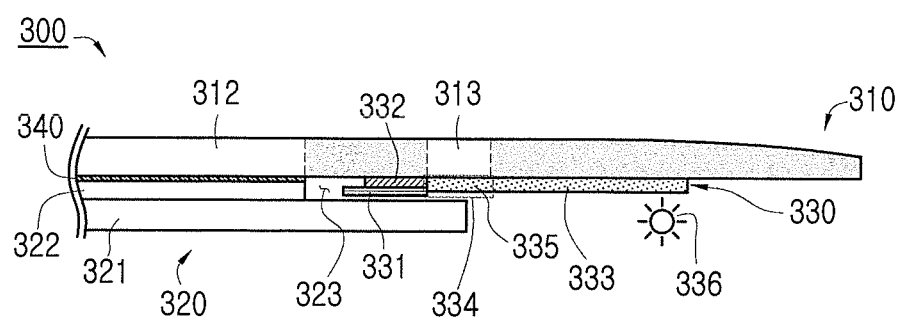
FIG. 4B illustrates a cross section of a mounting structure for circuit boards in an electronic device according to an exemplary embodiment of the present disclosure.

FIG. 4B illustrates a mounting structure for circuit boards in an electronic device according to an exemplary embodiment of the present disclosure.

Referring to FIG. 4B, the main board 320 and the sub board 330 are fixed to the housing 310. The display panel 322 of the main board 320 and the window 212 of the housing 310 can be attached to each other using an adhesive 340. This adhesive 340 can be an SVR, an OCA and the like. When the main board 320 is attached to the housing 310, there is a void space, specifically, a space that the display panel 322 does not occupy between the main board 320 and the housing 310. This space 323 houses the at least portion of the sub board 330.

Further, as aforementioned, the light guide film 333 has a portion 335 capable of being fitted into the opening 334 and has a shape extended from the light source 336 such that the light guide film 333 is placed side by side horizontally with the PCB 331. This is to consider a size (volume) of the void space 323 between the housing 310 and the main board 320. The sub board 330 can reduce a thickness of the portion housed in the void space 323 between the housing 310 and the main board 320. This construction can reduce a failure of a process of attaching the display panel 321 of the main board 320 to the window 312 of the housing 310. The reason is given as described above.

Figure 4C:
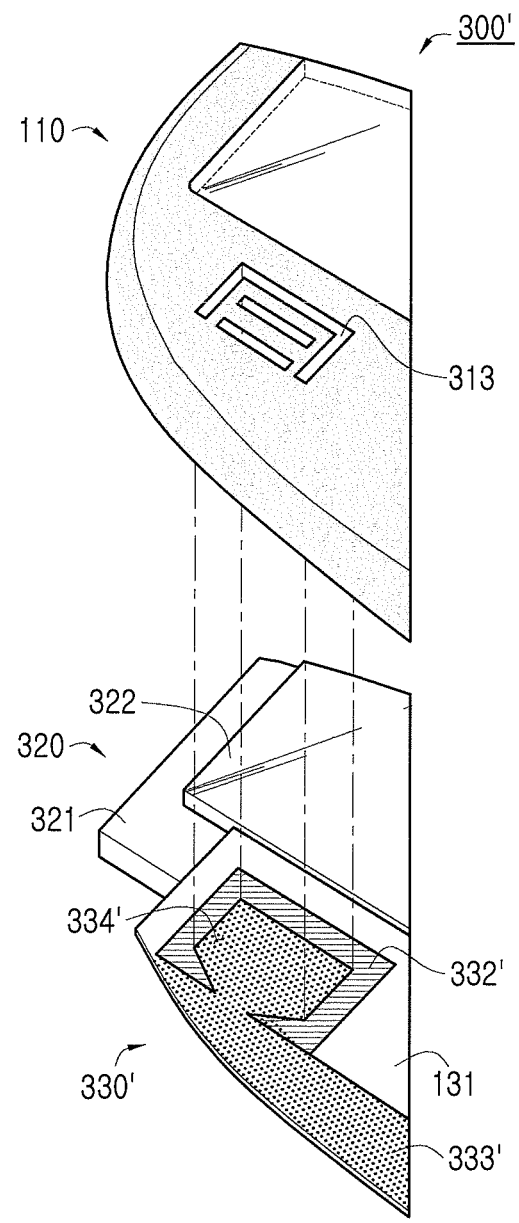
FIG. 4C illustrates a shape of an electrode surface of a sub board in an electronic device according to an exemplary embodiment of the present disclosure.

FIG. 4C illustrates a shape of an electrode surface of a sub board in an electronic device according to an exemplary embodiment of the present disclosure.

Referring to FIG. 4C, an opening 334' of a sub board 330' does not cover the indicator part 113 of the housing 110 and is opened in at least one side, and an opened portion of the opening 334' has a bottleneck shape. Further, an electrode surface 332' of the sub board 330' is constructed around the opening 334'. The electrode surface 332' is more extended than the electrode surface 332 illustrated in FIG. 4A and thus, enhances touch recognition.

In exemplary embodiments of the present disclosure, a touch sensor is constructed in a main board but, without being limited to this, the touch sensor can be constructed in a sub board. The sub board constructing the touch sensor may sense a touch through an electrode surface and transmit a signal for this to the main board. In response to the signal received from the sub board, the main board can perform a corresponding function.

As described above, a mounting structure for circuit boards according to the present disclosure can reduce or minimize a size of an electronic device.

While the disclosure has been shown and described with reference to certain preferred embodiments thereof, it will be understood by those skilled in the art that various changes in form and details may be made therein without departing from the spirit and scope of the disclosure as defined by the appended claims.

What is claimed is:

1. A mounting structure for circuit boards in an electronic device, the mounting structure comprising:
- a housing including a button indicator part;
- a first circuit board fixed to the housing;
- a second circuit board overlapped with at least a portion with the first circuit board and fixed to the housing and including a module configured to receive a touch, wherein the module forms an opening behind the button indicator part of the housing and includes a light guide film extending from the opening to a light source that is not incident on the opening and wherein the second circuit board is positioned between (i) a surface of the housing that includes the button indicator part and (ii) the light source; and
- an electrical connector configured to electronically connect the first circuit board and the second circuit board, wherein:
    - the housing includes a window, wherein the first circuit board includes a display panel mounted on the first circuit board and configured to display an image, and wherein the display panel of the first circuit board is attached to the window of the housing,
    - the first circuit board includes circuitry configured to perform a function according to a touch induced in the second circuit board,
    - the module comprises:
        - an electrode surface constructed around the opening; and
        - a Printed Circuit Board (PCB) or Flexible PCB (FPCB) including a circuit connected to the electrode surface, and
    - the light guide film is constructed in the first circuit board or second circuit board.

2. The mounting structure of claim 1, wherein a void space is present between the housing and the first circuit board, and wherein at least a portion of the second circuit board is disposed in the void space.

3. The mounting structure of claim 1, wherein at least a portion of the second circuit board is disposed in a space that the display panel does not occupy between the housing and the first circuit board.

4. The mounting structure of claim 1, wherein the first circuit board or second circuit board includes a mounted touch sensor configured to sense the touch through the electrode surface.

5. The mounting structure of claim 1, wherein the light guide film fills the opening.

6. The mounting structure of claim 1, wherein the light guide film is not disposed between the first circuit board and the second circuit board.

7. The mounting structure of claim 1, wherein the light guide film is fitted at one portion into the opening and is disposed horizontally, instead of being laminated with the PCB or FPCB.

8. The mounting structure of claim 7, wherein the opening is opened in at least one side and wherein an opened portion of the opening has a bottleneck shape.

9. The mounting structure of claim 1, wherein the first circuit board and the second circuit board are not in contact with each other.

10. The mounting structure of claim 1, wherein the electrical connector comprises at least one of an FPCB, a cable, or a wire.

11. An electronic device comprising:
- a housing including a window and a button indicator part;
- a main board attached to the window of the housing and including a display panel mounted on the main board, the display panel configured to display an image;
- a sub board attached to the button indicator part of the housing and including a module configured to receive a touch, wherein the module forms an opening behind the button indicator part of the housing and includes a light guide film extending from the opening to a light source that is not incident on the opening and wherein the sub board is positioned between (i) a surface of the housing that includes the button indicator part and (ii) the light source; and
- an electrical connector configured to electrically connect the main board and the sub board,
- wherein at least a portion of the sub board is disposed in a space that the display panel does not occupy between the housing and the main board,
- wherein the module further comprises:
    - an electrode surface constructed around the opening; and
    - a Printed Circuit Board (PCB) or Flexible PCB (FPCB) including a circuit connected to the electrode surface, and
- wherein the light guide film is constructed in the main board or the sub board.

12. The electronic device of claim 11, wherein the main board or the sub board includes a mounted touch sensor configured to sense the touch through the electrode surface.

13. The electronic device of claim 11, wherein the light guide film fills the opening.

14. The electronic device of claim 11, wherein the light guide film is not disposed between the main board and the sub board.

15. The electronic device of claim 11, wherein the light guide film is fitted at one portion into the opening and is disposed horizontally, instead of being laminated with the PCB or FPCB.

16. The electronic device of claim 15, wherein the opening is opened in at least one side and wherein an opened portion of the opening has a bottleneck shape.

17. The electronic device of claim 11, wherein the main board and the sub board are not in contact with each other.

18. The electronic device of claim 11, wherein the electrical connector comprises at least one of an FPCB, a cable, or a wire.

* * * * *